United States Patent [19]

Matsunoshita

[11] Patent Number: 5,608,654
[45] Date of Patent: Mar. 4, 1997

[54] IMAGE CODING APPARATUS

[75] Inventor: Junichi Matsunoshita, Kanagawa, Japan

[73] Assignee: Fuji Xerox Co., Ltd., Tokyo, Japan

[21] Appl. No.: 315,352

[22] Filed: Sep. 30, 1994

[30]  Foreign Application Priority Data

Oct. 6, 1993  [JP]  Japan .................................. 5-250422

[51] Int. Cl.$^6$ ...................................................... G09C 1/10
[52] U.S. Cl. ........................................ 364/514 R; 395/114
[58] Field of Search ........................ 364/514 R; 348/395, 348/405, 419, 420; 360/39, 40; 395/114

[56]  References Cited

FOREIGN PATENT DOCUMENTS 4-48874  2/1992  Japan .
4-220878  8/1992  Japan .

OTHER PUBLICATIONS

Coding of Moving Pictures and Associated Audio— for Digital Storage Media at up to about 1.5 mbH/s—May 15, 1992—1–D 60.
New Scaled DCT Algorithms for Fused Multiply/Add Architectures—1991—Linzer et al. pp. 2201–2204.
A Fast DCT–SQ Scheme for Images—Nov. 1988—Arai et al—pp. 1095–1097.
The Journal Of The Institute Of Image Electronics Engineers Of Japan, vol. 18, No. 6, pp. 398–409, 1989.

*Primary Examiner*—Ellis B. Ramirez
*Assistant Examiner*—Thomas Peeso
*Attorney, Agent, or Firm*—Finnegan, Henderson, Farabow, Garrett & Dunner, L.L.P.

[57]  ABSTRACT

An image coding apparatus wherein coding processing is performed efficiently and the generated code amount is controlled to a substantially fixed level is disclosed. The image coding apparatus comprises a setting circuit for setting a coding parameter, a coding circuit for coding input image data using the coding parameter, a code amount measurement circuit for measuring the amount of codes generated by the coding circuit, an aimed code amount setting circuit for setting an aimed code amount, a calculation circuit for calculating a code amount difference between the aimed code amount and the generated code amount, and a coding parameter control apparatus for controlling the coding parameter of the setting circuit in accordance with the code amount difference such that the setting circuit first sets an initial value as the coding parameter and then sets, in accordance with the code amount difference calculated from the amount of codes newly generated using the initial value, another value as the coding parameter to be used for next coding for the same image data.

3 Claims, 6 Drawing Sheets

| j\i | 1 | 2 | 3 | 4 | 5 | 6 | 7 | 8 |
|---|---|---|---|---|---|---|---|---|
| 1 | 16 | 11 | 12 | 14 | 12 | 10 | 16 | 14 |
| 2 | 13 | 14 | 18 | 17 | 16 | 19 | 24 | 40 |
| 3 | 26 | 24 | 22 | 22 | 24 | 49 | 35 | 37 |
| 4 | 29 | 40 | 58 | 51 | 61 | 60 | 57 | 51 |
| 5 | 56 | 55 | 64 | 72 | 92 | 78 | 64 | 68 |
| 6 | 87 | 69 | 55 | 56 | 80 | 109 | 81 | 87 |
| 7 | 95 | 98 | 103 | 104 | 103 | 62 | 77 | 113 |
| 8 | 121 | 112 | 100 | 120 | 92 | 101 | 103 | 99 |

FOR BRIGHTNESS COMPONENT

FIG. 2A

| j\i | 1 | 2 | 3 | 4 | 5 | 6 | 7 | 8 |
|---|---|---|---|---|---|---|---|---|
| 1 | 17 | 18 | 18 | 24 | 21 | 24 | 47 | 26 |
| 2 | 26 | 47 | 99 | 66 | 56 | 66 | 99 | 99 |
| 3 | 99 | 99 | 99 | 99 | 99 | 99 | 99 | 99 |
| 4 | 99 | 99 | 99 | 99 | 99 | 99 | 99 | 99 |
| 5 | 99 | 99 | 99 | 99 | 99 | 99 | 99 | 99 |
| 6 | 99 | 99 | 99 | 99 | 99 | 99 | 99 | 99 |
| 7 | 99 | 99 | 99 | 99 | 99 | 99 | 99 | 99 |
| 8 | 99 | 99 | 99 | 99 | 99 | 99 | 99 | 99 |

FOR CHROMATICITY COMPONENT

FIG. 2B

| j/i | 1 | 2 | 3 | 4 | 5 | 6 | 7 | 8 |
|---|---|---|---|---|---|---|---|---|
| 1 | 0 | 1 | 5 | 6 | 14 | 15 | 27 | 28 |
| 2 | 2 | 4 | 7 | 13 | 16 | 26 | 29 | 42 |
| 3 | 3 | 8 | 12 | 17 | 25 | 30 | 41 | 43 |
| 4 | 9 | 11 | 18 | 24 | 31 | 40 | 44 | 53 |
| 5 | 10 | 19 | 23 | 32 | 39 | 45 | 52 | 54 |
| 6 | 20 | 22 | 33 | 38 | 46 | 51 | 55 | 60 |
| 7 | 21 | 34 | 37 | 47 | 50 | 56 | 59 | 61 |
| 8 | 35 | 36 | 48 | 49 | 57 | 58 | 62 | 63 |

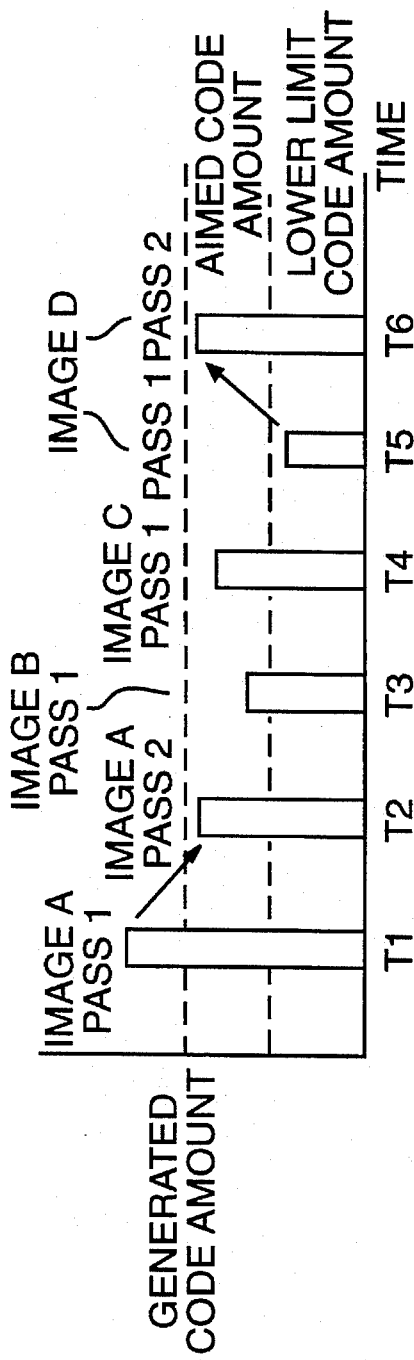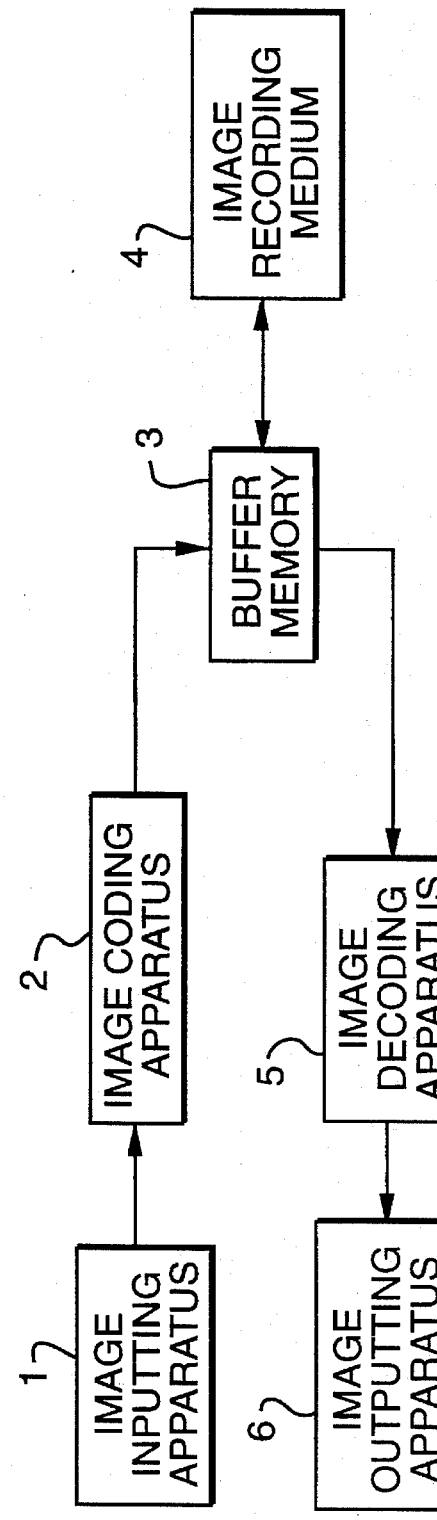

IMAGE CODING APPARATUS

BACKGROUND OF THE INVENTION

1. Field of the Invention

This invention relates to an image coding system wherein coding of still image data is controlled so that the amount of generated codes after coding may be substantially fixed irrespective of the image, and more particularly to an image coding apparatus suitable for use with an image processing apparatus wherein a plurality of originals are read in from an image inputting apparatus and stored onto an image recording medium and then they are read out by a designated number of times in a designated order and outputted from an image outputting apparatus.

2. Description of the Related Art

One of functions of an image processing apparatus such as a digital copying machine is an electronic sorter function of reading out data of a plurality of originals read in from an image inputting apparatus and stored on an image storage medium by a designated number of times in a designated order and outputting them from an image outputting apparatus. In order to store a large number of images onto an image recording medium having a limited capacity in an image processing apparatus (hereinafter referred to as electronic sorter) having such an electronic sorter function, coding of inputted image data is performed.

FIG. 9 shows an example of construction of an electronic sorter. Referring to FIG. 9, when a plurality of original images are inputted one by one from an image inputting apparatus 1, the inputted images are coded one by one by an image coding apparatus 2. Then, the coded image data are temporarily stored into a buffer memory 3 and finally recorded onto an image recording medium 4. After the plurality of images inputted from the image inputting apparatus 1 are all recorded onto the image recording medium 4 in this manner, outputting of the images is started. The images recorded on the image recording medium 4 are read out and decoded in a designated order by an image decoding apparatus 5 by way of the buffer memory 3 and outputted from an image outputting apparatus 6.

By the way, as a representative one of high efficiency coding systems for still natural image data, for example, the ADCT coding system which is a combination of orthogonal transform and variable length coding is known. It has been decided that the ADCT coding system is adopted as the international standards for the color still picture coding system (Magazine of the Image Electronic Engineering Society of Japan, Vol. 18, No. 6, pp. 398–409), and it can be applied also as a coding system for an electronic sorter. An outline of the ADCT coding system will be described below.

In the ADCT coding system, an input image is normally divided into blocks of 8×8 picture elements, and two-dimensional DCT transform (discrete cosine transform) is performed for each block to produce 8×8 DCT coefficients. By converting the actual space of an image into a frequency space by such DCT transform, information included in the image can be concentrated upon DCT coefficients of low frequency components having a good visual characteristic. Each of the DCT coefficients is quantized with a quantization step width determined taking the visual characteristic into consideration, and the thus quantized DCT coefficients are scanned in order from the lowest frequency component coefficient to re-arrange them into one-dimensional data, whereafter coding such as Huffman coding is performed for the one-dimensional data. The ADCT coding system is a kind of variable length coding system, and when the coding parameter is fixed, it generates a different amount of codes depending upon the image.

When the ADCT system is applied to an electronic sorter, the amount of codes of coded images must be controlled to be equal to or lower than the capacity of the buffer memory 3. To this end, several methods of controlling the code amounts for each image have been proposed.

For example, Japanese Patent Laid-Open No. Hei 4-48874 proposes a method wherein an aimed code amount and an actually generated code amount are compared with each other for each image and the coding parameter is adjusted in accordance with a result of the comparison to repeat coding so that the generated code amount may be equal to or lower than the aimed code amount to control the code amount. Japanese Patent Laid-Open No. Hei 4-220878 proposes another method wherein a generated code amount is measured using a plurality of different coding parameters for each picture element to find out a relationship between the quantization parameter and the generated code amount and a quantization parameter with which an aimed code amount may be generated is estimated from the relationship, and then coding is performed using the thus estimated quantization parameter to control the code amount.

While the two methods can control the generated code amount to be substantially equal to an aimed code amount, a plurality of coding processes are required to effect compression coding of an image, and there is a problem in that the processing speed is low.

SUMMARY OF THE INVENTION

It is an object of the present invention to provide an image coding apparatus wherein the coding processing is performed efficiently and the generated code amount can be controlled to a substantially fixed level.

In order to attain the object described above, according to an aspect of the present invention, there is provided an image coding apparatus for coding and recording input image data onto an image recording medium, which comprises setting means for setting a coding parameter, coding means for coding the input image data using the coding parameter set by the setting means, code amount measurement means for measuring the amount of codes generated by the coding means, aimed code amount setting means for setting an aimed code amount, calculation means for calculating a code amount difference between the aimed code amount and the generated code amount, and coding parameter control means for controlling the coding parameter of the setting means in accordance with the code amount difference such that the setting means first sets an initial value as the coding parameter and then sets, in accordance with the code amount difference calculated from the amount of codes newly generated using the initial value, another value as the coding parameter to be used for next coding for the same image data.

According to another aspect of the present invention, there is provided an image coding apparatus for coding and recording input image data onto an image recording medium, which comprises blocking means for blocking the input image data, discrete cosine transform means for transforming the output of the blocking means by discrete cosine transform, quantization means for quantizing the output of the discrete cosine transform means, the quantization means including a quantization matrix for quantizing discrete cosine transform coefficients of the discrete cosine transform means, coding means for coding a result of the quantization by the quantization means, setting means for setting an aimed code amount, calculation means for calculating a code amount difference between the aimed code amount and an amount of codes generated by the coding means, a scaling factor control circuit for controlling a scaling factor for correcting the discrete cosine transform coefficients of the quantization matrix in accordance with the code amount difference from the calculation means, the scaling factor control circuit including a table in which the relationship between the code amount error and the scaling factor determined in advance is stored, and scaling factor initial value setting means for setting an initial value to be adopted as the scaling factor by the scaling factor control circuit upon starting of coding.

With both of the image coding apparatus, almost all images can be controlled to a substantially fixed generated code amount by at most two times of coding processing irrespective of the image inputted, and beside, the processing speed can be enhanced.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIGS. 2A and 2B are diagrammatic views showing examples of quantization matrix;

FIG. 8 is a diagram illustrating the code amount control with respect to time by the image coding apparatus shown in FIG. 7; and FIG. 9 is a block diagram showing an example of construction of an electronic sorter.

DESCRIPTION OF THE PREFERRED EMBODIMENTS

Figure 1:
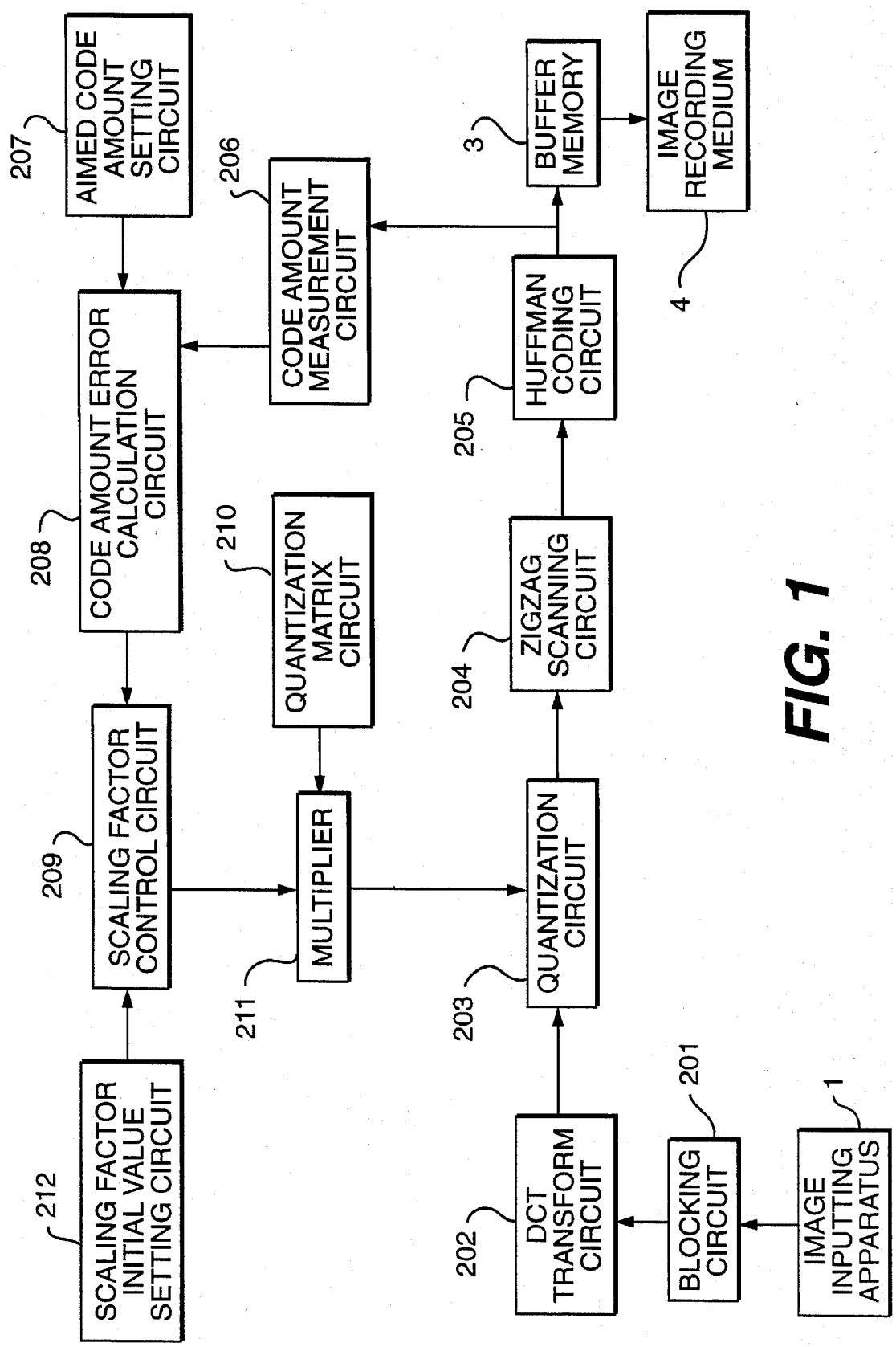
FIG. 1 is a block diagram of an image coding apparatus showing a preferred embodiment of the present invention.
Figures 3, 4:
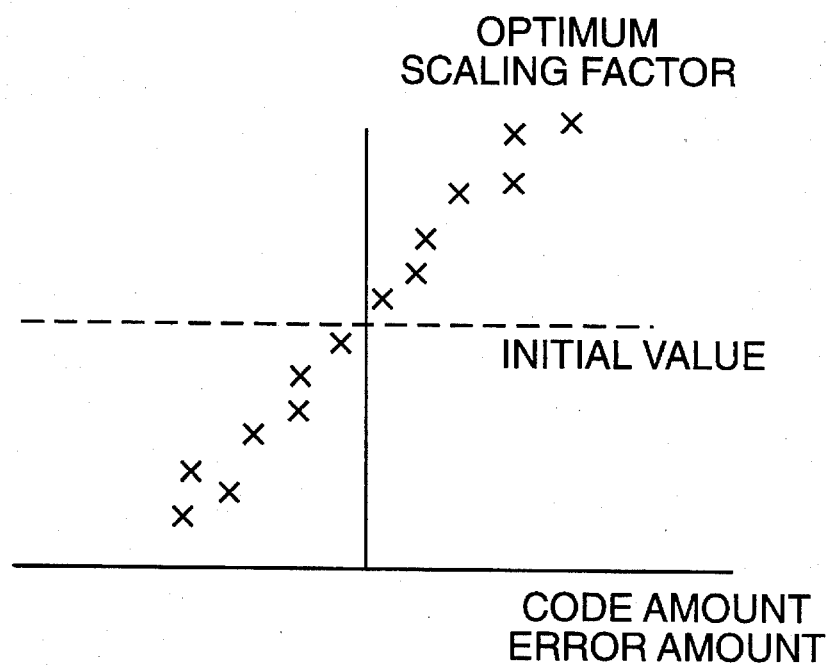
FIG. 3 is a diagrammatic view showing an example of sequence table for zigzag scanning.
FIG. 4 is a diagram illustrating the relationship between a code amount error amount and an optimum scaling factor.

Referring first to FIG. 1, there is shown an image coding apparatus according to a preferred embodiment the present invention which is suitably incorporated in an electric sorter. An image inputted by an image inputting apparatus 1 is blocked with the 8×8 picture element size by a blocking circuit 201. The thus blocked image is transformed for each block into 8×8 DCT coefficients by DCT transform by a DCT transform circuit 202. The DCT coefficients are quantized with quantization step widths different for the individual DCT coefficients by a quantization circuit 203. The quantization step widths are obtained by multiplying such threshold values supplied from a quantization matrix circuit 210 and determined for the individual DCT coefficients as seen in FIG. 2A or 2B by a scaling factor supplied from a scaling factor control circuit 209 and common to all of the DCT coefficients by means of a multiplier 211. The thus quantized DCT coefficients are scanned in order beginning with the lowest frequency component coefficient in accordance with such a sequence table for zigzag scanning as seen in FIG. 3 by a zigzag scanning circuit 204 so that they are re-arranged into one-dimensional data. The thus one-dimensionally re-arranged DCT coefficients are coded by variable length coding by a Huffman coding circuit 205. The thus coded image data for one screen are stored once into a buffer memory 3 and then transferred to and stored onto an image recording medium 4.

Here, the amount of the thus generated codes must be controlled to be equal to or lower than the capacity of the buffer memory 3 so that the coded image data for one screen may be stored into the buffer memory 3 with certainty. On the other hand, a coded image generally exhibits greater deterioration in picture quality as the generated code amount by coding decreases (as the compression ratio increases). Accordingly, in order to suppress the picture quality deterioration below an allowable level, the generated code amount must be controlled so that it may be greater than a certain level, or in other words, so that the compression ratio may be lower than a certain level.

In order to solve the subjects described above, the coding parameter should be varied for each image to control the generated code amount to be fixed. The coding parameter used to control the generated code amount in the ADCT coding is a scaling factor. In particular, when the generated code amount is greater than an aimed value, the scaling factor is increased to increase the quantization step width to decrease the generated code amount. On the contrary when the generated code amount is lower than the aimed value, the scaling factor is decreased to decrease the quantization step width to increase the generated code amount. The generated code amount can be controlled by changing the scaling factor for each image.

Figure 5:
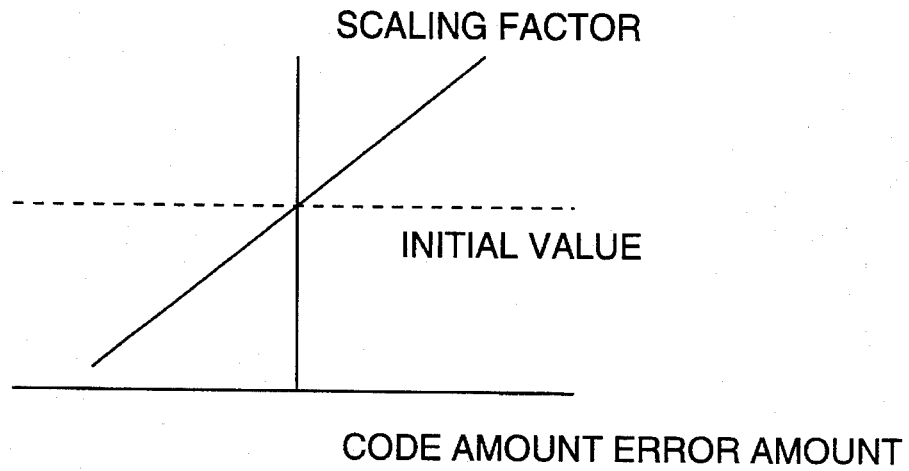
FIG. 5 is a diagram showing an example of scaling factor control function.

Subsequently, a method of determining an optimum scaling factor will be described. FIG. 4 illustrates the relationship between the code amount error amount and the optimum scaling factor, and FIG. 5 illustrates an example of scaling factor control function.

When coding is performed while the scaling factor is kept fixed to a certain initial value SFO, the code amount error ABR of the generated code amount from an aimed code amount and the optimum scaling factor SF with which the generated code amount coincides with the aimed code amount for each image have such a substantially linear relationship as seen from FIG. 4. This relationship is represented in such an approximate expression as given by expression (1) below:

$$SF = a \times \Delta BR + SFO \qquad (1)$$

where a is a constant. Thus, such a scaling factor control function as seen from FIG. 5 is obtained.

Therefore, in the embodiment of the present invention, the following control is performed. In particular, FIG. 6 illustrates the code amount control with respect to time, and in FIG. 6, the axis of abscissa indicates the time at which an image is coded, and the axis of ordinate indicates the amount of codes generated by coding an image.

Figure 6:
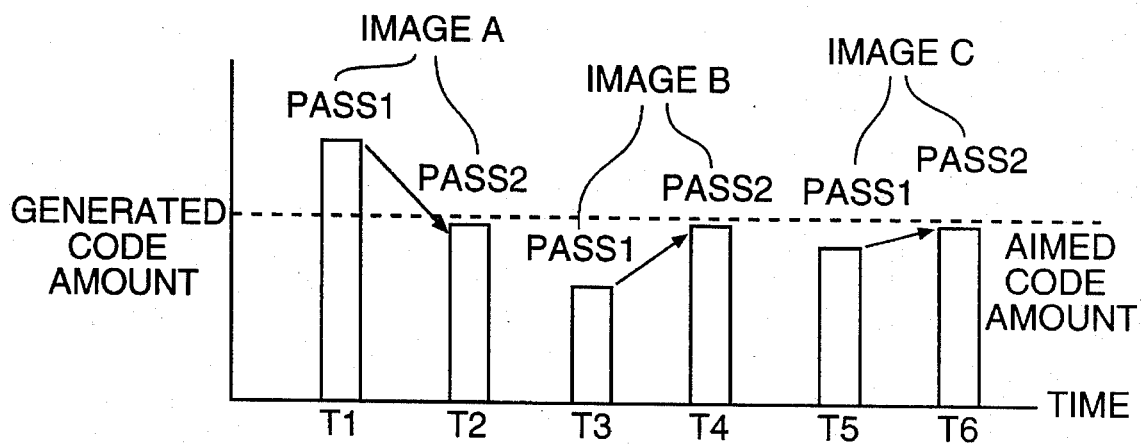
FIG. 6 is a diagram illustrating the code amount control with respect to time.

Referring to FIGS. 1 and 6, first at the first pass at time T1, a scaling factor initial value set by a scaling factor initial value setting circuit 212 is placed into the scaling factor control circuit 209 to code an image read in from the image inputting apparatus 1. Then, the generated code amount is measured by a code amount measurement circuit 206, and a result of the measurement is inputted to a code amount error amount calculation circuit 208. The code amount error amount calculation circuit 208 calculates an error (code amount error) of the generated code amount measured by the code amount measurement circuit 206 from an aimed code amount set equal to or lower than the capacity of the buffer memory 3 by an aimed code amount setting circuit 207. The error thus calculated is inputted to the scaling factor control circuit 209. The scaling factor control circuit 209 calculates an optimum scaling factor SF for causing the generated code amount to approach the aimed code amount from the code amount error ΔBR using the expression (1) given above and sets the thus calculated optimum scaling factor as a new scaling factor.

Then at the second pass at time T2, the image read in from the image inputting apparatus 1 again is coded using the optimum scaling factor set at the first pass. The generated code amount can be controlled to the aimed code amount with a high degree of accuracy by coding the same image again using the newly set scaling factor SF in this manner. Also for each of images B and C, the generated code amount can be controlled to an aimed code amount with a high degree of accuracy by performing processes at the first pass at time T3 and the second pass at time T4 or at the first pass at time T5 and the second pass at time T6 in a similar manner to those for the image A.

The calculation of the expression (1) may be performed using a calculator or using a conversion table (LUT: lookup table). Or, in order that the generated code amount may fall within an aimed code amount without fail, any of the approximate expressions (2) and (3) given below may be employed:

$$SF = a \times \Delta BR + SFO + b \quad (2)$$

$$SF = a1 \times \Delta BR + SFO (\Delta BR \geq 0)$$
$$\phantom{SF} = a2 \times \Delta BR + SFO (\Delta BR < 0) \quad (3)$$

where a and b are constants, and a1 and a2 are constants and a1>a2.

The expression (2) is intended to make the value of the optimum scaling factor a rather higher value so that the generated code amount at the second pass may be lower than the aimed code amount without fail, and to this end, the constant b is added to the right side of the expression (1). Meanwhile, the expression (3) is intended to increase the decreasing degree of the value of the scaling factor when the code amount generated by the coding processing at the first pass is equal to or greater than the aimed code amount but decrease the increasing degree of the value of the scaling factor when the code amount generated is lower than the aimed code amount so that the generated code amount at the second pass may be smaller than the aimed code amount without fail, and to this end, the constant a in the expression (1) is changed over in accordance with the positive or negative sign of ΔBR.

By performing such control as described above, for almost all images, the generated code amount can be controlled to a substantially fixed level by two times of coding processing.

Figure 7:
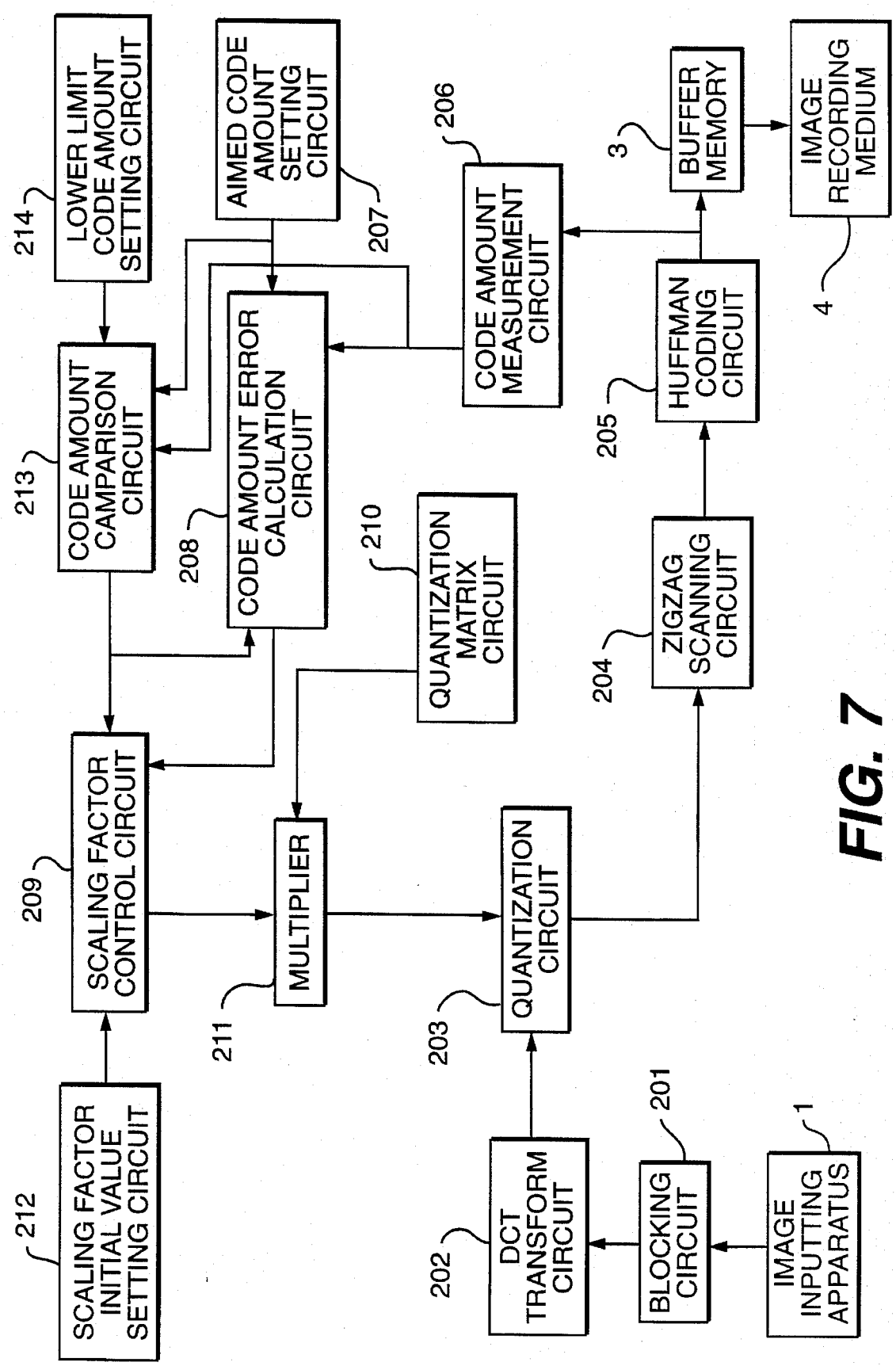
FIG. 7 is a block diagram of an other image coding apparatus showing another preferred embodiment of the present invention.

FIG. 7 shows an image coding apparatus according to another embodiment of the present invention. The image coding apparatus is generally constructed such that an upper limit code amount and a lower limit code amount are set and the second pass is performed to effect control of the generated code amount only when the generated code amount at the first pass does not fall within the range equal to or lower than an aimed code amount but equal to or higher than the lower limit code amount. To this end, the image coding apparatus of the present embodiment includes, in addition to the components of the image coding apparatus of the first embodiment described hereinabove with reference to FIG. 1, a lower limit code amount setting circuit 214 and a code amount comparison circuit 213.

Referring to FIG. 7, at the first pass, an image read in from the image inputting apparatus 1 is coded using a scaling factor initial value set by the scaling factor initial value setting circuit 212. In this instance, the generated code amount is measured by the code amount measurement circuit 206, and the code amount comparison circuit 213 determines whether or not the thus measured generated code amount falls within the range equal to or lower than an aimed code amount set by the aimed code amount setting circuit 207 but equal to or higher than a lower limit code amount set by the lower limit code amount setting circuit 214. When the generated code amount is within the range equal to or lower than the aimed code amount but equal to or higher than the lower limit code amount, the coding processing for the image is ended. On the contrary when the generated code amount is not within the range equal to or lower than the aimed code amount but equal to or higher than the lower limit code amount, code amount control processing at the second pass is performed in a similar manner as in the first embodiment.

The operations will be described in more detail with reference to FIG. 8 which illustrates the code amount control by the image coding apparatus of FIG. 7 with respect to time. In FIG. 8, the axis of abscissa indicates the time at which an image is coded, and the axis of ordinate indicates the amount of codes generated by coding an image.

At time T1, an image A is inputted from the image inputting apparatus 1 and coded by the image coding apparatus 2 (201 to 214) using a scaling factor initial value (pass 1). Since the generated code amount of the image A in this instance is greater than the aimed code amount, an optimum scaling factor is calculated and set. At time T2, the image A is inputted again from the image inputting apparatus 1 and coded by the image coding apparatus 2 again using the optimum scaling factor (pass 2). Since the optimum scaling factor is set so as to achieve generation of an amount of codes equal to or lower than the aimed code amount but equal to or higher than the lower limit code amount from the image A, the generated code amount at the pass 2 falls within the range equal to or lower than the aimed code amount but equal to or higher than the lower limit code amount, and consequently, the generated codes are recorded onto the image recording medium 4.

At time T3, another image B is inputted from the image inputting apparatus 1 and coded by the image coding apparatus 2 using the scaling factor initial value (pass 1). Since the generated code amount from the image B in this instance remains within the range equal to or lower than the aimed code amount but equal to or higher than the lower limit code amount, the generated codes are recorded onto the image recording medium 4, and no second pass is performed for the generated codes. Similarly at time T4, a further image C is inputted from the image inputting apparatus 1 and coded by the image coding apparatus 2 using the scaling factor initial value (pass 1). Since the generated code amount from the image C in this instance remains within the range equal to or lower than the aimed code amount but equal to or higher than the lower limit code amount, the generated codes are recorded onto the image recording medium 4, and no second pass is performed.

At time T5, a still further image D is inputted from the image inputting apparatus 1 and coded by the image coding apparatus 2 using the scaling factor initial value (pass 1). Since the generated code amount from the image D in this instance is smaller than the lower limit code amount, an optimum scaling factor is calculated and set. At time T6, the image is inputted again from the image inputting apparatus 1 and coded by the image coding apparatus 2 again using the optimum scaling factor (pass 2). The generated code amount at the pass 2 falls within the range equal to or lower than the aimed code amount but equal to or higher than the lower limit code amount, and consequently, the generated codes are recorded onto the image recording medium 4.

Since such control as described above is performed, whatever original is inputted, the code amount to be generated can be accommodated into the range equal to or lower than the aimed code amount but equal to or higher than the lower limit code amount and coding processing is completed at the first pass for most originals. Accordingly, the number of images recorded onto an image recording medium within a fixed period of time is increased comparing with the alternative case wherein an optimum scaling factor is calculated every time and coding is performed again using the thus calculated optimum scaling factor, and this enhances the processing speed of the electronic sorter.

It is to be noted that the present invention is not limited to the particular embodiments described above, and various alterations and modifications can be made thereto. For example, while, in the embodiments described above, the scaling factor is employed as a coding parameter for controlling the generated code amount, alternatively the individual coefficients of the quantization matrix may be controlled directly. Further, while an optimum coding parameter is calculated using a linear expression of the code amount error, it may be set arbitrarily using a table.

What is claimed is:

1. An image coding apparatus for coding and recording input image data onto an image recording medium, comprising:

setting means for setting a coding parameter;

coding means for coding the input image data using the coding parameter set by said setting means;

code amount measurement means for measuring the amount of codes generated by said coding means;

aimed code amount setting means for setting an aimed code amount;

calculation means for calculating a code amount difference between the aimed code amount and the generated code amount; and coding parameter control means for controlling the coding parameter of said setting means in accordance with the code amount difference such that said setting means first sets an initial value as the coding parameter and then sets, in accordance with the code amount difference calculated from the amount of codes newly generated using the initial value, another value as the coding parameter to be used for next coding for the same image data.

2. An image coding apparatus for coding and recording input image data onto an image recording medium, comprising:

blocking means for blocking the input image data;

discrete cosine transform means for transforming the output of said blocking means by discrete cosine transform;

quantization means for quantizing the output of said discrete cosine transform means, said quantization means including a quantization matrix for quantizing discrete cosine transform coefficients of said discrete cosine transform means;

coding means for coding a result of the quantization by said quantization means;

setting means for setting an aimed code amount;

calculation means for calculating a code amount difference between the aimed code amount and an amount of codes generated by said coding means;

a scaling factor control circuit for controlling a scaling factor for correcting the discrete cosine transform coefficients of said quantization matrix in accordance with the code amount difference from said calculation means, said scaling factor control circuit including a table in which the relationship between the code amount difference and the scaling factor determined in advance is stored; and scaling factor initial value setting means for setting an initial value to be adopted as the scaling factor by said scaling factor control circuit upon starting of coding.

3. An image coding apparatus for coding and recording input image data onto an image recording medium, comprising:

first setting means for setting a first coding parameter;

first coding means for coding the input image data using the coding parameter set by said first setting means;

code amount measurement means for measuring the amount of code generated by said means;

aimed code amount setting means for setting a desired code amount;

calculation means for calculating a code amount difference between the desired code amount and the generated code amount;

deciding means for deciding, based on the code amount difference, whether to recode the input image data using a second coding parameter different from said first coding parameter;

second setting means for setting a second coding parameter in accordance with the code amount difference;

second coding means for coding the input image data using the second coding parameter.

* * * * *

UNITED STATES PATENT AND TRADEMARK OFFICE
CERTIFICATE OF CORRECTION

PATENT NO. : 5,608,654
DATED : March 04, 1997
INVENTOR(S) : Junichi MATSUNOSHITA It is certified that error appears in the above-indentified patent and that said Letters Patent is hereby corrected as shown below:

Claim 3, Col. 8, line 41, "said means" should read
--said coding means--.

Signed and Sealed this

Twenty-first Day of October 1997

Attest:

BRUCE LEHMAN

Attesting Officer            Commissioner of Patents and Trademarks